April 16, 1940.     R. F. METZGER     2,197,504
LENS MOUNTING
Filed April 28, 1938
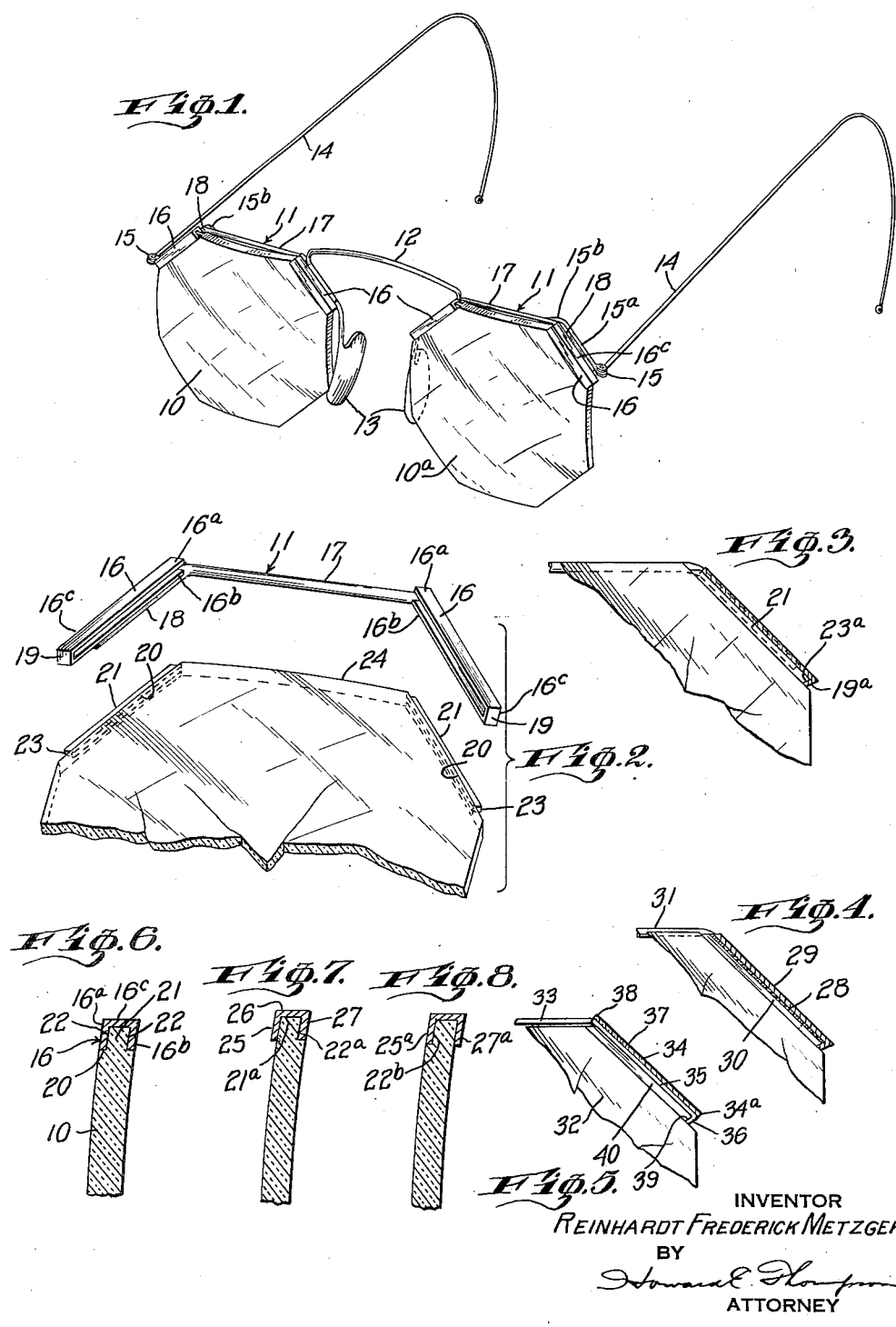

Patented Apr. 16, 1940

2,197,504

UNITED STATES PATENT OFFICE 2,197,504

LENS MOUNTING

Reinhardt Frederick Metzger, Glendale, N. Y.

Application April 28, 1938, Serial No. 204,733

9 Claims. (Cl. 88—47)

This invention relates to a lens mounting for eye glass lenses for supporting the nose bridges, ear loops, and other attachments to the glasses; and the object of the invention is to provide a mounting of the class described by means of which the lens may be quickly and easily attached and detached with respect to the mounting for repair, replacement or otherwise, and especially wherein a mounting of the character described will materially reduce the cost of installing lenses in lens frames or mountings in simplifying the labor of assembling the lenses in the mountings or frames; a still further object being to provide a frame or mounting for lenses of the character described which comprises resiliently coupled socket or cap members adapted to be tensionally supported upon the lens and to engage key members or flanges formed in peripheral edges of the lens in firmly securing the mounting or frame in position; and with these and other objects in view, the invention consists in a device of the class and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a perspective view of a pair of eye glasses diagrammatically illustrating a use of my invention.

Fig. 2 shows perspective views of one of my improved mountings or frames and part of a lens in exploded relationship one with respect to the other.

Fig. 3 is a sectional detail view showing a slight modification of the construction shown in Figs. 1 and 2.

Fig. 4 is a view similar to Fig. 3 showing another use of the invention.

Fig. 5 is a view similar to Fig. 4 showing another modification.

Fig. 6 is a sectional detail view through one edge portion of the lens showing part of the mounting or frame as employed in Figs. 1 to 4 inclusive.

Fig. 7 is a view similar to Fig. 5 showing another form of construction, and

Fig. 8 is a view similar to Figs. 5 and 6 showing another arrangement.

While in the accompanying drawing I have illustrated a lens of one particular shape and contour, and furthermore in Fig. 1 of the drawing have diagrammatically illustrated one type of glasses, it will be understood that my invention is applicable to any type and kind of glasses as well as to lenses of any peripheral shape or contour, as well as to the different types or strength of lenses for the correction of various eye weaknesses.

In Fig. 1 of the drawing I have diagrammatically illustrated a pair of glasses employing two lenses 10, 10a detachably clamped in my improved mountings or frames 11, to which are attached any suitable nose bridge or coupling 12 having, if desired, nose pieces 13. At 14 are shown the ear loop supporting rods hingedly coupled as seen at 15 to supports 15a secured to the frames 11 as later described. In some instances it is well known that the supports 14 are not employed, and these supports are varied in their location with respect to the periphery of the lenses. It is also understood that the structures 12, 13 are of numerous kinds and types to suit the styles of the manufacturer or optician, or the desires of a customer.

Each mounting or frame 11 is of identical construction, that is to say it consists of two socket portions 16, arranged in spaced relation to each other and coupled by a spring rod 17, the end portions 18 of which extend onto the parts 16 and are soldered, welded or otherwise secured thereto. Each socket 16 consists of outer and inner side plates 16a, 16b joined by a crosshead 16c so that the sockets are substantially of channelled cross-sectional form throughout the length thereof. The channels are closed at one end by a wall 19 forming a hook flange or member retaining the frame against displacement from the lens as will later appear.

At this time it is well to bear in mind that the contour of the members 16 will be such as to fit the contour of the peripheral edges of the lenses employed, regardless of the irregularity thereof. In the present construction, and for purposes of illustration only, an octagon type of lens is shown at 10, 10a and two edges 20 at opposed sides of the lens are ground and cut to form longitudinal projecting flanges 21 centrally of the edges 20 so as to form grooves 22 at the front and rear surfaces of the lens at said edges. Into these grooves the side walls 16a, 16b of the members 16 are adapted to rest, in the manner illustrated in Fig. 6 of the drawing.

The ends of the flanges 21 terminate in walls 23 which in the construction shown in Figs. 1 and 2, are perpendicular to the edges 20. In coupling the frame or mounting 11 with the lens, one hook member 19, for example the one at the right, note Fig. 2, is first arranged in engagement with the corresponding wall 23 of the flange 21 with the flange disposed within and between the walls 16a, 16b, after which the flange 21 is placed in the socket of the member 16 at the left. As the member 19 at the left normally is closer to the member 19 at the right than is the distance between the two end walls 23, the member 19 must be sprung over the wall 23 and the frame or mounting will then snap into position and will be securely held in such position by the tension of the spring rod 17. It will be understood that the coupling rod 17 may be disposed on either side or along the edge of the lens and may be of any desired contour, but it will preferably be disposed rearwardly of the upper edge 24 of the lens and shaped to conform with the contour of the lens so as to be rendered substantially invisible.

When the lens is snapped in position, as above stated, the same cannot be forcibly removed unless the nail of a finger or a suitable tool be inserted beneath one of the hook wall members 19 so as to spring the mounting off from the lens. It will be understood that when one side is disengaged, the other side is immediately removed from the lens.

At this time it is well to state that while one of the distinctive features of my invention resides in the possibility of detachably supporting the lens in the frame or mounting, it will of course be understood that when desired, the lens may be cemented within the sockets 16 in accordance with known methods to form a substantially permanent attachment.

In Fig. 3 of the drawing I have shown a slight modification of the construction shown in Figs. 1 and 2 wherein the end wall 23a of the flange 21 is undercut as clearly seen in Fig. 3, and the hook member or end wall 19a of the socket is correspondingly set inwardly to form with respect to the outer wall of the socket, a definite hook-shaped member. This construction will provide a greater interlocking arrangement between the lens and the socket members of the frame. However, it is to be understood that in the perpendicular arrangement of the walls 23, an actual hook-shaped projection is formed on the flanges with respect to what might be termed a vertical stress or strain; that is to say, with respect to a pull tending to separate the parts, assuming that the cross bar or connection 17 was grasped by the fingers of one hand and the lens by the fingers of the other hand and a pull be exerted on both parts.

In this connection while the recessing of the lens at opposite sides to form the flange 21 is desirable from a standpoint of reducing the thickness of the mounting, it will be understood that in thin lenses, all that will be necessary is to notch or cut the edges of the lens to form members equivalent to the members 23, 23a for receiving the hook members 19, 19a of the frame. The side walls of the sockets 16 then extend onto inner and outer surfaces of the lens. On the other hand, the inner surface only of the lens need be recessed, and at 22a in Fig. 7 of the drawing a lens is shown formed in this manner. With this construction, an outer wall 25 of a socket 26 is arranged on the outer surface of the lens whereas the inner wall 27 is disposed in the groove 22a. The resulting flange is indicated at 21a, which flange may be of the structure shown in Fig. 2 or 3.

As another adaptation of the invention, the outer surface of the lens may be grooved or recessed as seen at 22b so that the outer flange 25a seats in the groove 22b, and the inner flange 27a rests upon the inner surface of the lens. It is also understood that I may use in the several forms of construction shown, a cushion or lining between the peripheral edge of the lens, or the particular flange thereof, and the socket of the frame or mounting. To illustrate one of such uses, I have shown at 28 in Fig. 4 of the drawing a cushion which may be in the form of a film coating of slightly yielding material or may constitute in fact a layer of rubber, cork or other fibrous material which is disposed between the socket portion represented at 29 and the flange of the lens represented at 30.

In this construction, I have also shown at 31 part of the cross bar or spring rod for coupling the socket 29 of the frame. This bar, as will be noted protrudes slightly above the upper edge of the lens rather than being in alinement therewith, and either form of construction can be used and both would be rendered substantially invisible.

A lens mounting or frame of the character described will present a very neat appearance in the construction of eye glasses of various kinds and classes, regardless of the shape and contour of the lens, it being understood that the length as well as shape of the socket portions as at 16 and the corresponding length of the flanges as at 21 may be varied to suit different conditions.

It will be understood that the various other hardware or fixture portions of the complete eye glasses, for example the bridge 12, nose pieces 13 and supports as at 14, may have their respective parts welded, soldered, cemented or otherwise secured to the frame or mounting 11.

My improved frame or mounting may be correctly termed a tong frame, the members 19, 19a being equivalent to the grippers of a conventional pair of tongs, the same being constantly urged into operative position by the tension of the spring coupling rod 17.

The frame or mounting 11 may be composed of any suitable metals or of non-metallic materials suitable for this purpose, or a combination of metallic and non-metallic materials may be employed. It will be understood that the mounting or frame will constitute a distinct article of manufacture adapted for sale independent of the lenses and for interchangeable use with various lenses.

It will be further understood that the invention also consists in a novel lens structure as a distinct article of manufacture. This novel lens structure enables the carrying of replacement lenses for alternative or emergency use, which lenses may be easily attached to or detached from the frames without the use of any special tools.

In connection with the mounting of the rods 14 with the frames, it will be understood that the parts 15a may be in the form of support pieces, soldered or otherwise secured to the parts 18 of the frames, or the members 15a may extend partially onto the parts 17 as at 15b, note Fig. 1, and be secured at these points only to leave the remainder of the parts 15a free to flex independent of the frames to provide what may be termed a yielding or resilient mounting of the rods in connection with the frames. The purpose of the latter construction is to avoid any possibility of accidental disengagement of the sockets 16 with the lenses which might result in the accidental displacement of the lenses. However, from experience, I have found that this is not likely to occur in normal uses of the glasses.

In Fig. 5 of the drawing I have shown another form of construction wherein a lens 32 of the same general type as that shown at 10—10a in Figs. 1 and 2 is employed. Substituted for the spring rod 17 is a flat spring strip 33 which is preferably of the width of the socket or cup portions, one of which is shown at 34. The ends of the spring 33 instead of being disposed on one outer side of the socket extend into and is arranged longitudinally of the channel of the socket as shown at 35, terminating at its end in a hook shaped member 36 which takes the place of the hook end wall 19 of the socket 16 as in Fig. 2 of the drawing. With this construction the socket 34 is secured to the part 35 by riveting, soldering or otherwise, between the points indicated at 37, 38, so that the portion of the part 35 between the point 37 and the hook end 36 is free to flex relatively to the wall of the socket so as to provide independent movement of the outer end portion 34a of the socket without disturbing the engagement of the hook 36 with the end wall 39 of the flange portion 40 of the lens 32.

With this construction it will be understood that the various fixture parts may be directly secured to the sockets 34 without danger of accidental displacement of the lens in the handling of the eye glasses. At the same time it will be understood that the frame or mounting, consisting of the cross spring 33 and the sockets 34 at both ends thereof, only one being shown, is attachable and detachable the same as with the structure shown in Fig. 2.

It will of course be apparent that my invention is not limited to the particular arrangements of the mountings herein disclosed upon the peripheral edges of the lenses. For example, the frames or mountings may engage adjacent edge portions of a pair of lenses especially when glasses simply employing nose bridges are employed. In fact the mountings may assume any desired position throughout the peripheral edges of the lenses to adapt the mountings to the particular uses of the devices in question. It will also be apparent that my invention is not limited to any particular arrangement of the hook members in the cups or sockets; nor to any particular structure of the sockets so long as means is provided to support lenses against lateral displacement in addition to the tong-like grasping of the mountings with the lenses in coupling the same therewith and in retaining the lenses against displacement.

Having fully described my invention, what I claim as new and desire to secure by Letters Patent, is:

1. A prong frame for lenses of the character described comprising two sockets having inturned prongs at free end portions thereof, means resiliently coupling the sockets to normally support the prongs in a predetermined spaced relation to each other while permitting lateral flexure thereof under the tension of said resilient coupling thereby providing a tong-like engagement of said sockets with flanges formed at predetermined edges on a lens, said sockets comprising elongated straight channel members having top and parallel side walls, the over-all width of said channel members being substantially equal to the thickness of the lens engaged thereby, and said resilient coupling means comprising a spring rod having angular end portions arranged upon and secured to one side wall of each channeled socket.

2. A lens mounting of the character described comprising spaced lens-receiving parts having means for supporting lenses against lateral displacement therefrom, said parts having projecting members adapted to tensionally engage in tong-like manner peripheral edges of a lens by contacting the spaced end walls of flanges formed thereon to retain the mounting against displacement from the lens when subjected to stresses tending to pull the mounting from the lens while at the same time permitting detachment of the mounting from the lens by forcible disengagement of one of said projections from the peripheral edge of the lens, said lens-receiving parts comprising socket portions adapted to receive said flanges on the lens, a spring strip coupling said socket portions and normally supporting the same in predetermined spaced relation one with respect to the other, said spring strip having end portions extending into and arranged longitudinally of the socket portions and part of said end portions being freely flexible with respect to the socket portions, and the projecting members being formed on the freely flexed parts of the end portions of said spring.

3. In combination an optical lens and a detachable mounting therefor, said lens having spaced elongated protruding edge portions of less thickness than the thickness of said lens, said mounting comprising spaced channeled parts adapted to engage said spaced edge portions, means resiliently supporting said parts in spaced relation, said means conforming closely to the peripheral contour of said lens intermediate said protruding edge portions, said channeled parts having hook portions adapted to engage shoulders formed on said lens at remote ends of said protruding edge portions, said hooks being urged into tensional engagement with said shoulders by said resilient means, thereby positively retaining the lens against accidental displacement from the mounting while at the same time permitting attachment and detachment of the lens with respect to the mounting by manual outward flexure of the hook end portion of one of said parts, means attached to one of the channeled parts of said mounting for coupling and uniting another similar mounting therewith in forming a pair of glasses, and said coupling means joining the channeled part of said mounting at the end thereof adjacent said resilient supporting means thereby preventing displacement of the hook end of said channeled part from the corresponding shoulder on said lens by tension in said coupling means.

4. A lens mounting for a lens having spaced elongated protruding edge portions, said mounting comprising spaced channeled parts adapted to engage said spaced edge portions, means resiliently supporting said parts in spaced relation, said means conforming closely to the peripheral contour of said lens intermediate said protruding edge portions, said channeled parts having hook portions adapted to engage shoulders formed on said lens at remote ends of said protruding edge portions, said hooks being urged into tensional engagement with said shoulders by said resilient means, thereby positively retaining the lens against accidental displacement from the mounting while at the same time permitting attachment and detachment of the lens with respect to the mounting by manual outward flexure of the hook end portion of one of said parts, means attached to one of the channeled parts of said mounting for coupling and uniting another similar mounting therewith in forming a pair of glasses, said coupling means joining the channeled part of said mounting at the open end thereof thereby preventing displacement of the hook end of said channeled part from the corresponding shoulder on said lens by tension in said coupling means, and means secured to the resilient supporting means of said mounting adjacent the other channeled part thereof for securing other eye-glass fixtures thereto.

5. A lens adapted for a mounting having spaced sockets for tong-like engagement therewith, said lens being of predetermined peripheral contour, peripheral edges of the lens being ground at spaced intervals on at least one side surface of the lens to form at said edges projecting flanges, adjacent ends of the flanges being widely spaced, and the remote ends of said flanges having radial wall portions which in conjunction with said flanges form means for retaining the lens against accidental displacement from said mounting.

6. A lens adapted for a mounting having spaced sockets for tong-like engagement therewith, said lens having at upper side edges thereof projecting flanges widely spaced apart at the top of said lens, remote ends of said flanges having radial and slightly undercut wall portions adapted to be engaged by hooks formed at the ends of the mounting sockets associated therewith.

7. A lens mounting frame for lenses having spaced peripheral flanged portions, each having outer radial end walls, said frame corresponding to the peripheral contour of the particular lens associated therewith and having spring end parts, inwardly projecting ends on said spring parts adapted to engage said radial walls, a pair of channel members, inner adjacent end portions only of said members being secured to said spring parts in spaced relation to the projecting ends thereof, and the sides of said channel members extending over and engaging opposed surfaces of the lens flanges thereby securing the frame against displacement transversely of the lens while in no way impairing the action of said spring parts in securing the frame against circumferential displacement from the lens.

8. The combination with a lens having elongated projecting flanges at the upper side edges thereof, said flanges being of reduced thickness and spaced apart centrally of the top edge of said lens, of a lens mounting comprising spaced elongated channel clips adapted to be arranged on said flanges, a member adapted to extend along the lens adjacent to and concealed by the top edge thereof to resiliently couple said clips, and the remote ends of said clips having inwardly extending parts tensionally engaging the ends of said flanges in retaining the lens against displacement from said mounting.

9. An eyeglass frame comprising two lens mountings joined in end-to-end relation by a suitable bridge member, each of said mountings comprising spaced channel parts having hook portions at remote ends thereof, means resiliently coupling said parts to normally support the hook portions in predetermined spaced relation to each other while permitting lateral flexure thereof under the tension of said resilient coupling means, thereby producing a tong-like engagement of said parts with flanges formed at predetermined edges on a lens, said resilient means comprising a spring member closely conforming to the contour of said lens intermediate the inner ends of said parts, and the end portions of the mountings, forming remote ends of the frame, having resilient means secured thereto adjacent the inner ends of the lens engaging parts thereof, and extending along said parts disjoined therefrom, for securing other eyeglass fixtures to said frame.

REINHARDT FREDERICK METZGER.